Dec. 23, 1952     G. B. HILL     2,622,508
BALING PRESS
Filed Dec. 20, 1946
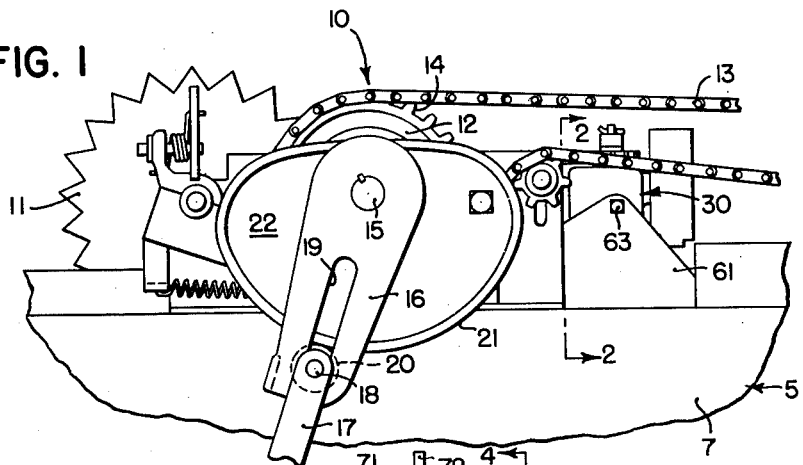
FIG. 1
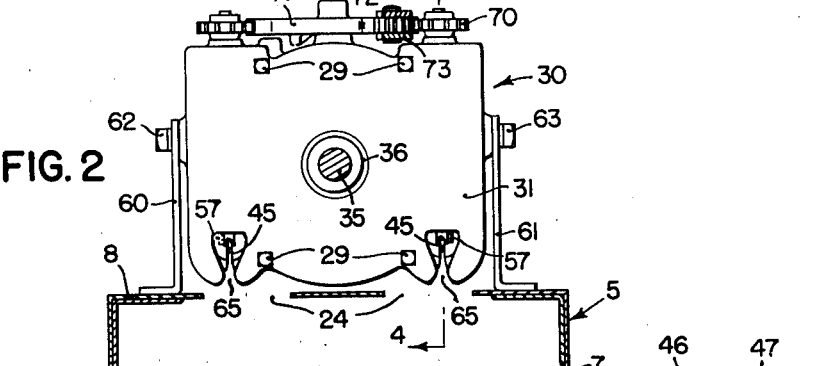
FIG. 2
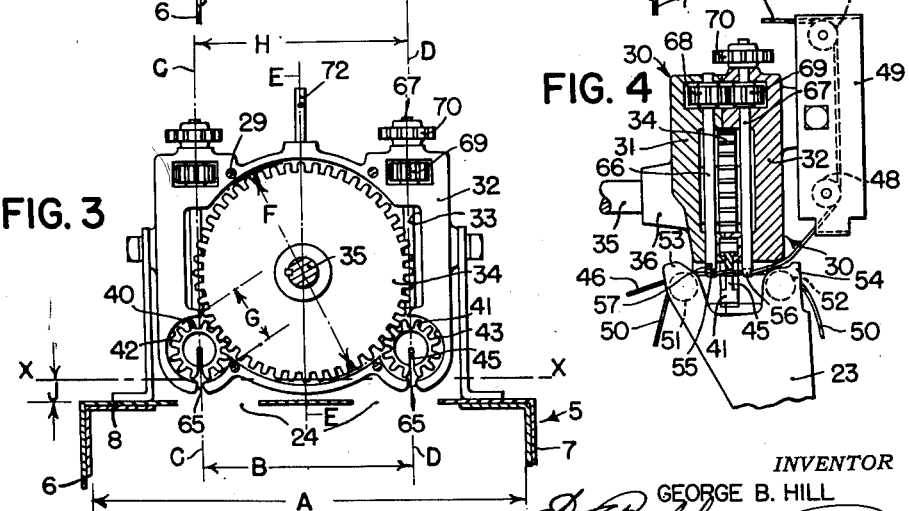
FIG. 3
FIG. 4
INVENTOR
GEORGE B. HILL
BY
ATTORNEYS Patented Dec. 23, 1952

2,622,508

UNITED STATES PATENT OFFICE 2,622,508

BALING PRESS

George B. Hill, Ottumwa, Iowa, assignor to Deere Manufacturing Co., a corporation of Iowa Application December 20, 1946, Serial No. 717,563

2 Claims. (Cl. 100—11)

The present invention relates to automatic wire-tying baling presses and more particularly to the wire tying mechanism thereof, and is in the nature of an improvement over the mechanism disclosed in a copending application, Serial No. 594,684 filed May 19, 1945 by Miles H. Tuft, now U. S. Patent 2,512,754, dated June 27, 1950. This mechanism includes a pair of slotted twister gears for receiving the strands of wire to be tied together and a single drive gear meshing with the twister gears for driving the latter to twist the wires together to secure the bale. The two twister gears were disposed in diametrically opposed relation to the drive gear, the latter being of a diameter three times the diameter of each twister gear and the three gears positioned in a plane perpendicular to a wall of the bale case, thus spacing the two binding wires on the bale. One revolution of the drive gear rotated the twister gears three times. This arrangement had two disadvantages: the large diameter of the drive gear spaced the twister gears away from the bale case so that when the wires were tied around the bale they were too long to hold the material tightly compressed in the bale; and it was found that the wires should be twisted together more than three times to secure them properly. Merely increasing the diameter of the drive gear disposed of the second disadvantage but resulted in spacing the twister gears even farther from the bale case, thereby exaggerating the first mentioned disadvantage.

The principal object of the present invention relates to the provision of an arrangement of drive and twister gears in which the spacing between the two wires on the bale is maintained at the desired amount, the drive gear is increased to four times the diameter of the twister gears, and the twister gears are disposed closely adjacent the wall of the bale case in order that the wires are bound tightly around the bales.

These and other objects and advantages of this invention will be apparent to those skilled in the art after a consideration of the following description, in which reference is had to the drawings appended hereto, in which Figure 1 is a side elevational view of a portion of a baling press including the wire tying mechanism associated therewith;

Figure 2 is a sectional elevational view of the press as taken along a line 2—2 in Figure 1 and showing a part of the wire tying mechanism;

Figure 3 is an elevational view similar to Figure 2 but with the front half of the casing removed; and Figure 4 is a sectional elevational view taken along a line 4—4 in Figure 2, showing the upper end of the needle in tying position.

Referring now to the drawings, the baling press includes a bale case 5 having a pair of vertical side walls 6, 7, a top wall 8 and a bottom wall (not shown) forming a hollow case of rectangular cross section, on the order of eighteen inches between the side walls and sixteen inches between the top and bottom walls. Mounted on top of the bale case 5 is automatic wire tying mechanism indicated generally by reference numeral 10 and including a serrated measuring wheel 11 adapted to contact the bale being formed and to initiate a tying operation when the bale acquires a predetermined length, by means of a self interrupting clutch 12 receiving power from a continuously driven chain 13 and sprocket 14. The clutch rotates a shaft 15 through a single revolution responsive to the completion of a revolution by the measuring wheel 11, thereby rotating an arm 16 through one revolution. The arm 16 is connected to a link 17 by a pin 18 passing through a slot 19 and shiftable therein radially of the arm. A roller 20 is journaled on the pin 18 and rolls around a track 21 on the edge of a stationary plate 22. The link 17 is connected to a pair of needles 23, which are normally disposed beneath the bale case 5, and operates during a rotation of the shaft 15 to raise the needles upwardly through the bale case 5 to insert the upper ends of the needles through openings or apertures 24 in the top wall 8 into tying position, indicated in Figure 4. Further reference to the exact spacing of these openings will be made below.

The mechanism so far described is disclosed and claimed in copending applications, Serial No. 598,363, filed June 8, 1945 by George B. Hill and J. R. West, and Serial No. 602,810 filed July 2, 1945 by H. W. Bloss, and is not disclosed herein in detail inasmuch as it does not form an essential part of the present invention.

Coming now to that part of the structure with which the present invention is more particularly concerned, the wire tying mechanism includes a casing 30 comprising a pair of complementary sections 31, 32 secured rigidly together by bolts 29, thus defining a drive gear chamber 33, within which is rotatably disposed a drive gear 34 fixed to a drive shaft 35 journaled in suitable bearings 36 in the casing 30. The shaft 35 is connected by suitable gearing (not shown) to the shaft 15 to be rotated through a single revolution when the shaft 15 rotates through one revolution. A pair of twister gears 40, 41 are rotatably disposed within a pair of chambers 42, 43, respectively, within the casing 30 and mesh continuously with the drive gear 34. The twister gears have no supporting shafts but are confined within their respective chambers 42, 43 as they are rotated by the drive gear 34. The twister gears each have a diameter equal to one-fourth the diameter of the drive gear 34 and therefore rotate four times during a single revolution of the drive gear 34. As best seen in Fig. 3, the diameter of the drive gear 34 is substantially equal to the distance between the axes of the twister gears.

Each of the twister gears 40, 41 is provided with a radial slot 45 extending from the center of the gear outwardly between two gear teeth to receive the two strands of wire to be tied together. These strands are conventionally and preferably spaced apart on the basis of what may be termed a "wire-spacing" distance, which is here substantially equal to one-half the width of the bale case. Hence, although the openings 24 may not have their center lines so spaced apart, they are of sufficient size to include the wire-spacing distance therebetween and in any event provide access respectively to the wires. One strand 46 is drawn from an upper coil of wire (not shown), passing downwardly around a pair of vertically spaced sheaves 47, 48 journaled in a bracket 49 attached to the casing 30. The strand 46 passes through the slot 45 in the associated twister gear 41 and thence over the top of the bale being formed, at the opposite end of which the strand 46 is tied to a lower strand 50. The lower strand 50 encircles the end and bottom of the bale and passes over a pair of small sheaves 51, 52 journaled in a pair of upstanding fingers 53, 54 on the upper end of the needle 23, from which the strand 50 extends down along the needle to a lower coil of wire (not shown). Another pair of upper and lower coils and a needle are associated with the other twister gear 40 as described above.

After the bale has attained its predetermined length, the wire tying mechanism is actuated, causing the needles to move upwardly through the bale case to bring the lower strands of wire 50 into the respective slots 45 in the twister gears 40, 41, as indicated in Figure 4. A revolution of the drive gear 34 then rotates the twister gears 40, 41, each of which twists the two strands 46, 50 within the slot 45 four times, after which the strands are severed between the twisted portions, and the latter are kinked by a pair of kinkers 55, 56.

Inasmuch as the kinking mechanism is not directly concerned here, a detailed description thereof is not deemed necessary, but a complete disclosure is contained in the above mentioned application by H. W. Bloss. It is sufficient to state that the pair of kinkers 55, 56 associated with each of the twister gears are disposed on opposite sides of the associated gear, respectively, and are mounted on a pair of vertical shafts 66, 67, journaled in the casing 30. The shafts are connected by a pair of meshing gears 68, 69 and are driven by a gear 70 fixed to the upper end of one of the shafts 67 above the casing 30. The gear 70 is rotated by a gear segment 71 rotatably mounted on a spindle 72 on top of the case 30. After the twister gears have rotated to twist the strands together, the gear segment 71 is oscillated by suitable means (not shown) acting through a link 73, thereby causing the kinkers to rotate through a portion of a revolution and return to their original position.

The strands are severed by a cutting edge 57 on one of the kinkers 55, as the latter rotates about a vertical axis, the edge 57 acting against the edge of the slot 45 in the associated twister gear to sever the wires. This leaves the strands 46, 50 around the bale now tied together by one of the twisted portions, while the other twisted portion ties the wires 46, 50 from the upper and lower coils. The needles are then withdrawn and a new bale is begun with the next charge of baling material.

The casing is mounted on the top wall 8 of the bale case by means of a pair of upstanding brackets 60, 61, which are bolted to opposite sides, respectively, of the casing 30 by bolts 62, 63, with the slots 45 in the twister gears 40, 41 directly above and in register with the apertures 24 in the wall 8. The casing 30 is provided with slots 65 in the lower portion thereof beneath and in register with the slots 45 in the gears 40, 41, respectively, to provide for bringing the lower strands 50, by means of the needles 23, up through the bale case, through the apertures 24, and through the casing slots 65 into the gear slots 45.

Important features of the invention reside in the relative dimensions of the parts so as to locate the twister gears 40 and 41 relatively close to the top of the bale case, and thus they are relatively close to the bale being tied. This results in the elimination of excess slack in the baling wires.

As shown in Figure 3, the side walls 6 and 7 of the bale case are spaced apart a distance A. The horizontal axes of the twister gears 40 and 41 are spaced apart a transverse distance B, which is substantially one-half the distance A. It will be seen that the distance B is included in the spacing of the openings 24. The line C—C is a line perpendicular to the axis of the left-hand twister gear 40 and the line D—D is a line perpendicular to the axis of the right-hand twister gear 41. The line E—E is perpendicular to the axis of rotation of the large gear 34.

F is the diameter of the gear 34 and G is the diameter of each of the twister gears 40 and 41. H is the distance between the lines C—C and D—D, or the distance between the axes of the twister gears. J designates the relatively close proximity between a line X—X and the top of the bale case 5. The line X—X is tangent to the bottoms of the three gears 34, 40 and 41.

It will be observed that the diameter F of the gear 34 is substantially equal to the distance H. The distance H is substantially equal to the distance B, which may be referred to as a wire-spacing distance, which, as stated above, is substantially equal to one-half the distance A between the two walls that adjoin the top wall of the bale case.

It will be also observed that the diameter G of each of the twister gears is on the order of approximately one-fourth that of the diameter F of the gear 34.

I claim:

1. In a baling press having a plurality of walls assembled to provide an elongated bale case of rectangular section in which are formed bales of hay or straw the cross-sectional area of which is determined by the dimension of the bale case walls, one of the walls having a pair of openings spaced apart transversely of the bale case and of such size as to include between them a wire-spacing distance substantially equal to one-half the distance between the two walls that adjoin said one wall, the openings being spaced equally at opposite sides of the longitudinal centerline of the bale case to provide access to bale-tying wires spaced apart according to said wire-spacing distance, the improvement residing in tying mechanism positioned adjacent said one wall and comprising: a support for the tying mechanism overlying said bale case wall and bridging the openings; gearing carried by the support and consisting solely of three gears, including a pair of twister gears respectively in register with the openings in the bale case wall and rotatable on axes that are spaced apart on the order of the wire-spacing distance and that are generally parallel to said bale case wall so that each twister gear rotates in a plane that is generally normal to the wall, each of said axes being closely spaced outwardly from said wall in a direction normal to said wall and the diameter of each twister gear being such that the wall-proximate portion of the periphery of each twister gear is in close proximity to its associated opening and hence in close proximity to its respective wire around a bale in the case; the third gear of said gearing being a single rotatable large gear in constant mesh with the twister gears and having its axis of rotation parallel to the twister gear axes, the diameter of said large gear being substantially equal to the distance between the twister gear axes and the proportion of said large gear to the twister gears being such that the wall-proximate peripheral portions of said three gears are substantially tangent to a plane closely paralleling said one bale case wall.

2. The invention defined in claim 1, further characterized in that: the diameter of each twister gear is on the order of one-fourth the diameter of the large gear.

GEORGE B. HILL.

REFERENCES CITED

The following references are of record in the file of this patent:

UNITED STATES PATENTS

| Number | Name | Date |
|---|---|---|
| 535,754 | Gates | Mar. 12, 1895 |
| 894,876 | Clark | Aug. 4, 1908 |
| 1,369,612 | Bowers | Feb. 22, 1921 |
| 2,456,476 | West | Dec. 14, 1948 |